United States Patent
Royle

(10) Patent No.: US 6,811,454 B2
(45) Date of Patent: Nov. 2, 2004

(54) SUSPENSION SYSTEM

(75) Inventor: David Albert Cyril Royle, Durham (GB)

(73) Assignees: British Waterways Board, Watford (GB); Covelink Marine Limited, Durham (GB)

(*) Notice: Subject to any disclaimer, the term of this patent is extended or adjusted under 35 U.S.C. 154(b) by 0 days.

(21) Appl. No.: 10/362,666

(22) PCT Filed: Aug. 22, 2001

(86) PCT No.: PCT/GB01/03781
§ 371 (c)(1),
(2), (4) Date: Feb. 21, 2003

(87) PCT Pub. No.: WO02/16152
PCT Pub. Date: Feb. 28, 2002

(65) Prior Publication Data
US 2003/0176119 A1 Sep. 18, 2003

(51) Int. Cl.[7] .................................................. B60F 3/00
(52) U.S. Cl. ........................................................ 440/12.5
(58) Field of Search .......................................... 440/12.5

(56) References Cited

U.S. PATENT DOCUMENTS

| 3,779,574 A | 12/1973 | Ow |
| 3,831,200 A | 8/1974 | Ow |
| 3,858,260 A | 1/1975 | Hanser |
| 5,176,098 A * | 1/1993 | Royle .......................... 114/344 |
| 5,356,162 A | 10/1994 | Derrien |
| 5,593,175 A | 1/1997 | Oda et al. |
| 6,159,058 A * | 12/2000 | Matheson .................. 440/12.5 |

FOREIGN PATENT DOCUMENTS

| FR | 2443369 A | 7/1980 |
| WO | 91/05676 | 5/1991 |
| WO | WO 93/15923 | 8/1993 |

* cited by examiner

Primary Examiner—Stephen Avila
(74) Attorney, Agent, or Firm—Howard & Howard

(57) ABSTRACT

A suspension system for an amphibious vehicle is able to be locked in either a lowered or in a retracted position according to whether the vehicle is on land or in water, respectively. The suspension system includes a main suspension arm pivoted to a vehicle hull at one end thereof and has a rotably mounted road wheel thereon at an opposite end thereof. A moving mechanism operably attached to the pivoted main suspension arm enables the arm and the road wheel to be retracted relative to the hull. An upper suspension link is operably and pivotally connected to the road wheel end of said main suspension arm and has a pivoted joint intermediate its ends. The upper suspension link is operably engagable with a suspension position locking mechanism in both the lowered and retracted positions.

23 Claims, 5 Drawing Sheets

SUSPENSION SYSTEM

BACKGROUND OF THE INVENTION

1. Technical Field

The present invention relates to a retractable suspension system for an amphibious vehicle, the suspension system being able to be raised when the vehicle is floating in water and lowered again prior to the vehicle being beached.

2. Related Art

Amphibious vehicles having retractable suspension systems are known, for example, from WO93/15923. In prior art suspension systems the suspension is held in the lowered or retracted positions by means of either a hydraulic ram, for example, or by utilisation of the weight of the suspension system itself. However, hydraulic cylinders can fail and using the weight of the suspension system itself can be problematic especially when the vehicle is in the water and being subjected to rough weather pounding.

Thus it is an object of the present invention to provide a suspension system which may be locked in the lowered or retracted positions without having to rely upon hydraulic cylinders or inertia forces due to the suspension mass.

SUMMARY OF THE INVENTION

According to the present invention, there is provided a suspension system for an amphibious vehicle, the suspension system being able to be locked in either a lowered or in a retracted position according to whether the vehicle is on land or in water, respectively, the suspension system comprising: a main suspension arm pivoted to a vehicle hull at one end thereof, the arm having a rotatably mounted road wheel thereon at an opposite end thereof. A moving mechanism is operably attached to the pivoted main suspension arm to enable the arm and the road wheel to be retracted relative to said hull. An upper suspension link is operably and pivotably connected to the road wheel end of the main suspension arm and has a pivoted joint intermediate its ends. The upper suspension link is pivoted on the hull at an axis remote from the pivoted joint. The upper suspension link is operably engagable with a suspension position locking mechanism in both the lowered and retracted positions.

In this specification the term "hull" is used to denote any part of the body of the vehicle on which the suspension system according to the present invention is mounted or interacts with. The suspension arms and links may not be directly pivotally mounted onto the hull but may be mounted on sub-frame or bracket means, for example, which sub-frame means are mounted on the hull. In this way whole suspension units may be attached to a hull rather than in piecemeal fashion. The term "hull" thus includes suspension units or components fixed either directly to the vehicle hull or indirectly to the vehicle hull by sub-frames, brackets and the like.

The term "suspension system" as used herein in its broadest sense denotes the running gear which is retractable and lowerable and on which the vehicle rests and travels when on land. Thus, in its broadest sense the term "suspension system" need not include suspension springs and shock absorbing means.

In a preferred embodiment of the present invention, the suspension system according to the present invention further includes spring and shock absorbing devices.

The spring device may be any suitable device such as coil springs and/or torsion bars for example. The shock absorbing device may also be any type suitable for the application such as telescopic dampers or lever arm shock absorbers or any known system which is suitable, for example.

The moving mechanism may be selected from any that is suitable for the application such as hydraulic or pneumatic cylinders, ball-screw type actuators, chain or belt drives, for example.

The suspension raising and lowering mechanism may alternatively be in the form of a torsion bar rotating about the axis where the main suspension arm, or the axis where any other suspension arm, is pivoted to the hull. In such cases, the torsion bar may also act as the road-going suspension spring.

The suspension system according to the present invention is suitable for a rear, non-steering suspension or, with the addition of a swivel hub at the road wheel to main suspension arm junction, a steerable suspension system may be provided.

A drive mechanism may also be provided to the road wheel by any suitable means such as by articulated drive shaft to the road wheel or by belt or chain drive means to the road wheel.

The suspension position locking mechanism may comprise mechanical means which operably engage with the upper suspension link to prevent further movement of this component when in either of two extreme positions resulting from the suspension system being lowered or retracted.

When being lowered or raised, the wheel of the suspension system generally moves in the plane of the wheel, i.e. normal to the axis of rotation thereof.

THE DRAWINGS

In order that the present invention may be more fully understood, examples will now be described by way of illustration only with reference to the accompanying drawings, of which:

DETAILED DESCRIPTION

Figure 1:
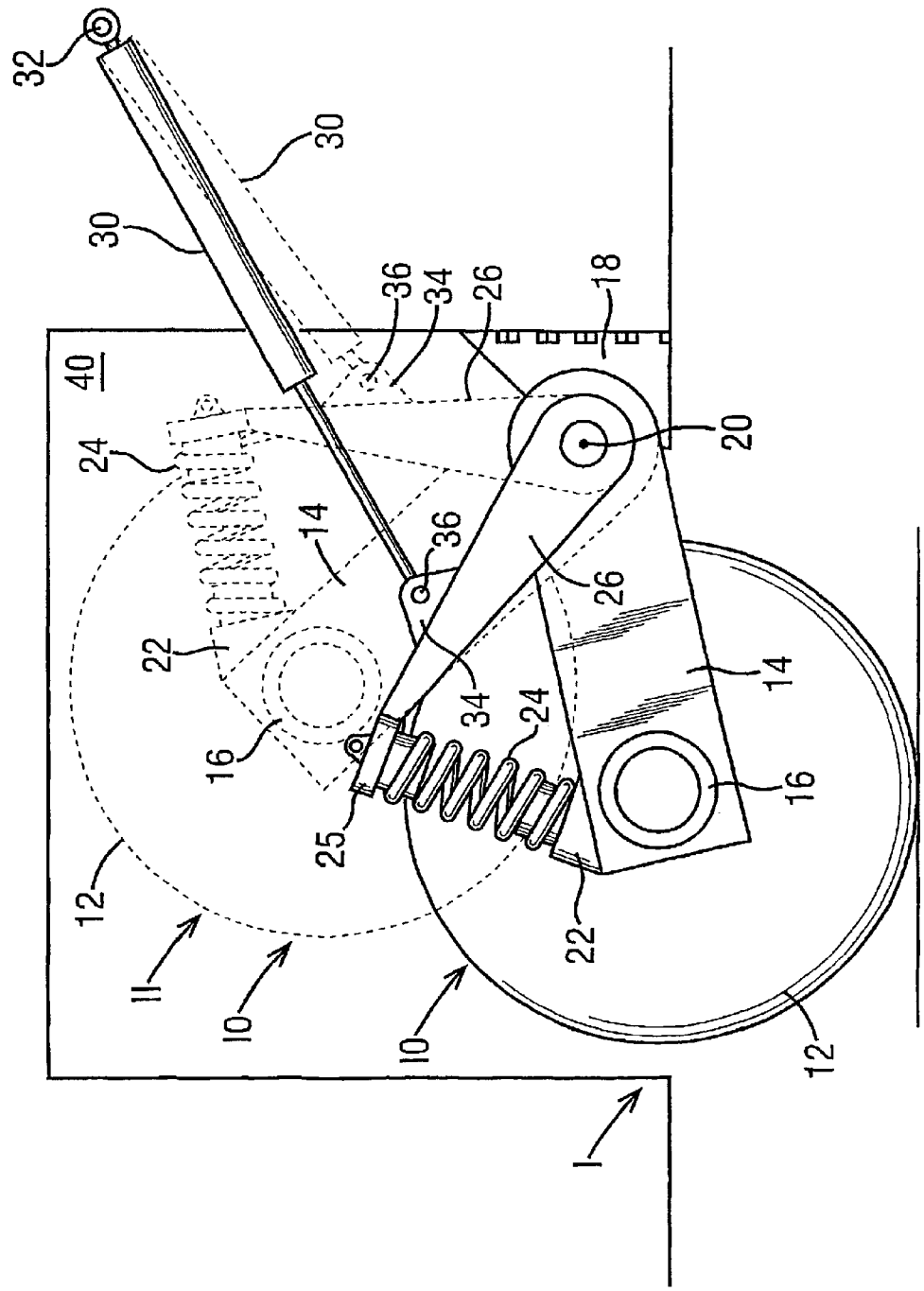
FIG. 1 shows a schematic side view of part of a mechanism in a suspension system according to the present invention for raising and lowering a road wheel.
Figure 2:
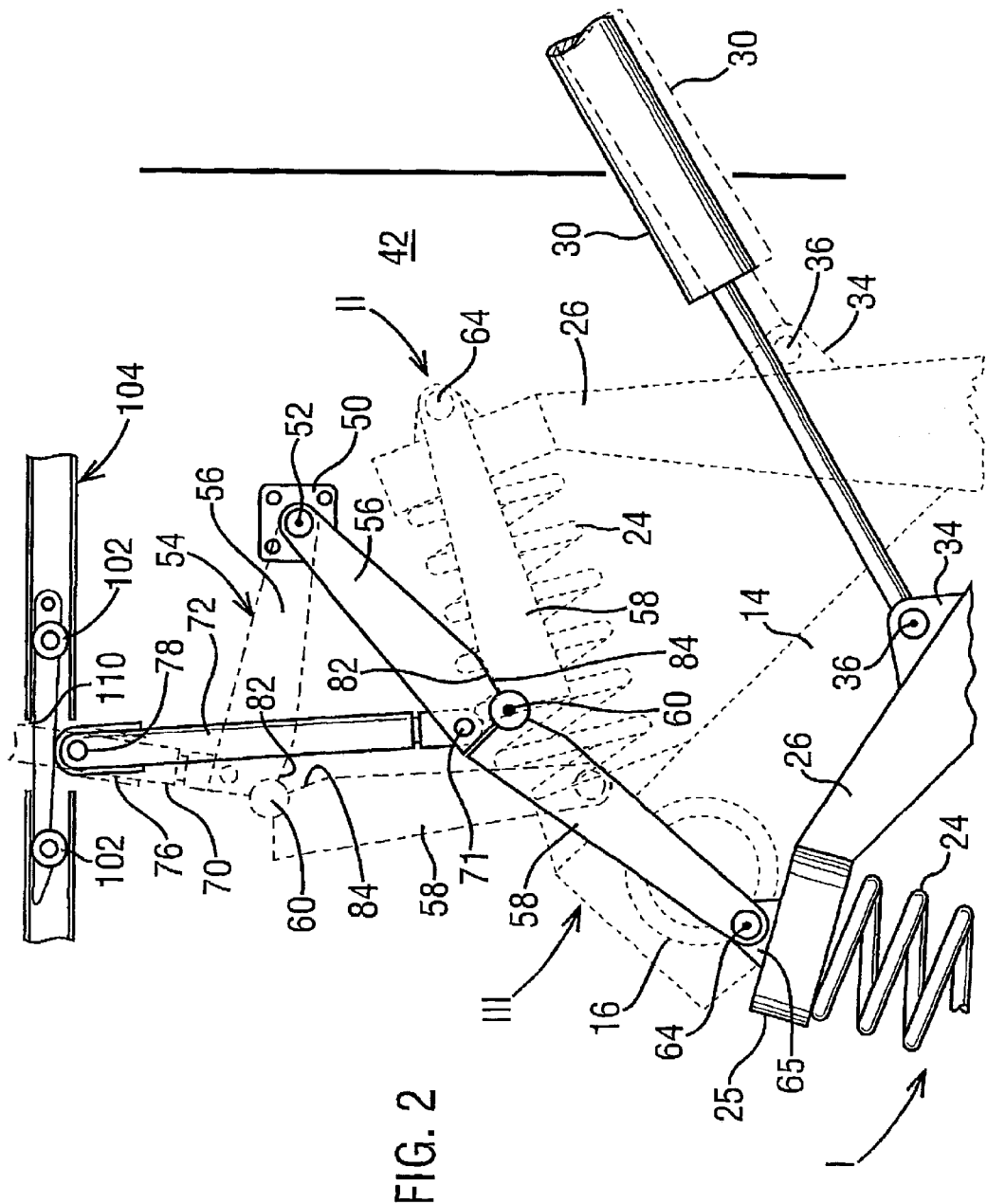
FIG. 2 shows part of the mechanism of FIG. 1 connected to the remaining suspension components and a locking mechanism according to a first embodiment according to the present invention.
Figure 3:
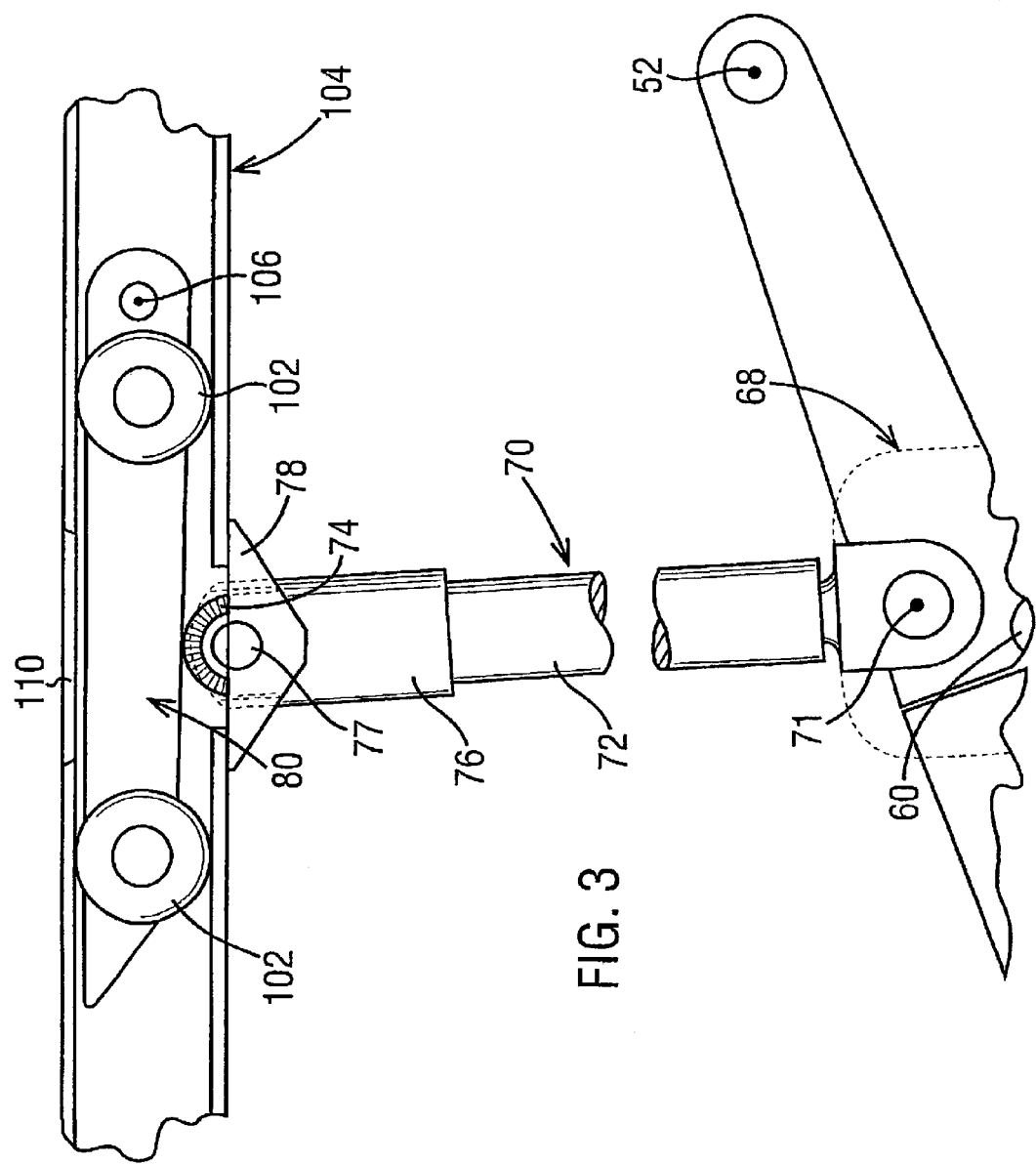
FIG. 3 shows the locking mechanism of FIG. 2 in greater detail.

Referring now to FIGS. 1 to 3 and where the same features are denoted by common reference numerals.

FIG. 1 shows a road wheel 12 raising and lowering mechanism which is depicted generally at 10. The raising and lowering mechanism comprises a main suspension arm 14 having the wheel 12 mounted thereon via a hub 16 which locates the wheel and incorporates bearings (not shown) and a drive chain or shaft (both not shown) to deliver driving power to the wheel 12. The suspension arm 14 is pivotally mounted to the vehicle hull at a strong point 18 such as a bracket or sub-frame as shown in FIG. 1, the pivot 20 being marked with reference to its axis. Drive may be provided to the wheel 12 via a chain (not shown) within the suspension arm 14 which is in the form of a hollow casing which may be filled with lubricant, the drive being provided via a shaft (not shown) rotating about the axis 20. At the hub 16 end of the suspension arm 14 is a mounting 22 for a suspension coil spring and concentric shock absorber (not shown) unit 24 as is known to those people skilled in the suspension art. The other end of the coil spring shock absorber unit 24 is fixed to one end 25 of a second suspension arm 26 which is also pivoted about the axis 20 and mounted on the hull strong point 18. Thus, the arms 14 and 26 may rotate relative to each other about the axis or pivot point 20 depending on the degree of compression or extension of the coil spring 24 and damper unit. The arms 14 and 26, and coil spring damper unit 24 may be considered to be a suspension unit and may be raised or lowered as a unit by means of a cylinder and piston unit 30 which is fixed to the vehicle hull at one end via a pivot 32 and at the other end to the second suspension arm 26 via a bracket 34 and pivot 36. The suspension unit and wheel 12 depicted at 10 is shown in two positions in FIG. 1, a first lowered position, indicated generally by the arrow "I" and, in a second, raised position, indicated generally by an arrow "II". As will be appreciated, the suspension unit 10 is lowered and retracted by pivoting around the axis 20 on the hull 18. In the raised position II, the wheel is retracted into a wheel/suspension receiving well 40 in the vehicle hull and the wheel 12 and suspension unit 10 are thus raised out of the water when the vehicle is afloat.

The lowered position I corresponds to a road going position and the retracted position II corresponds to a water-borne situation of the vehicle. Clearly, when the vehicle is about to leave the water and be driven onto land, the suspension system will be lowered whilst the vehicle is still afloat.

FIGS. 2 and 3 illustrate the load bearing or suspension position locking mechanism which ensures that the suspension unit 10 of FIG. 1 does not rely solely upon the cylinder and ram 30 to support the weight of the vehicle when in road use nor the weight of the retracted suspension when the vehicle is water borne. The suspension position locking mechanism comprises a strong fixed pivot bracket 50 fixed to the vehicle hull, the pivot bracket 50 having a stub shaft 52 on which is pivotally mounted an upper suspension locking link 54 which comprises a first generally U-shaped bracket member 56 and a pair of extension arms 58 which are pivoted at 60 to the open ends of the U-shaped bracket 56 at one end and pivoted at 64 to the outer swinging end 25 of the second suspension arm 26 at a bracket 65 which also receives the top end of the spring damper unit 24. The suspension unit 10 is locked in the lowered or retracted positions by a rod 70 which is attached to the open end of the U-shaped bracket 56 by means of a yoke 68 (not shown in FIG. 2 for the sake of clarity) which is also pivoted at the pivot 60 and connected at the middle to one end of the rod 70 (see FIG. 3) at a pivot 71. The rod 70 comprises a rigid strut member 72 having a roller 74 at its upper extremity and which bears upon a locking device 80 which will be described in greater detail with reference to FIG. 3. The strut 72 is constrained to slide in a trunnion member 76 which is itself pivotally mounted at 77 and held in a bracket 78. In the absence of the locking device 80, the wheel may be lowered or retracted as desired.

FIG. 2 shows the suspension link 54 of the suspension unit 10 in three positions. Position I shows the link 54 when the wheel is in the fully lowered position; position II shows the suspension link 54 when the wheel is in the fully retracted position; and, position III shows suspension link 54 when the wheel is in an intermediate position between positions I and II either being raised or lowered. In the fully lowered position (I) the U-shaped upper suspension link member 56 and the extension arms 58 are linearly disposed with respect to each other. In position II the link 54 and extension arms are folded back on each other such that the faces 82, 84 meet. Position III shows the link member 56 and arms 58 in a mid-position between the extremes of positions I and II.

In order to lock the suspension in position I in the road-going position, the locking device 80 which is in the form of a tapered wedge 100, which is moveable on rollers 102 in a strong rectangular section tube 104 fixed to the hull, is moved to a position where the roller 74 bears upon the underside of the wedge member 100. Thus, the roller 74 on the strut 72 bears against the wedge member 100 preventing the suspension from collapsing. It should be remembered that the piston cylinder unit 30 is also present as a secondary locking facility. When the suspension is to be raised, the wedge member 100 is withdrawn by means of a second hydraulic cylinder (not shown) or other comparable means connected to the eye 106 allowing the suspension unit 10 to be raised into position II. When this happens the strut 72 passes initially through the aperture 110 in an upper face of the tube 104 whilst the link 54 and arms 58 are folding together. In the latter half of the suspension retraction cycle the strut 72 begins to be retracted until eventually at the end of the folding and retraction cycle it is again in the same position as when the suspension is in the fully lowered position and the wedge member 100 may be repositioned to close the aperture 110 and lock the strut 72 in position with the suspension in position II. In FIG. 2 the strut 72 is shown passing through the wedge 100 when in position II, however, the wedge 100 is not present during the raising or lowering cycles and is only inserted into its locking position when the suspension unit 10 is either fully retracted or fully lowered. It should be understood that the suspension system is both raised and lowered whilst the vehicle is afloat thus, only the weight of the suspension system, not that of the whole vehicle, is initially borne by the ram and cylinder 30.

An advantage of the first embodiment of the suspension system according to the present invention is that it cannot jam in either the locked up or locked down positions. The locking member 100 moves on rollers 102 and the suspension strut 72 has a roller at the locking end thereof thus, the locking mechanism of the suspension system according to the present invention does not rely on pins and the like fitting into tight holes which a liable to jamming. Furthermore, the loads imposed on the individual components of the suspension system are relatively low which provides for reliable operation and relatively light weight.

Figure 4:
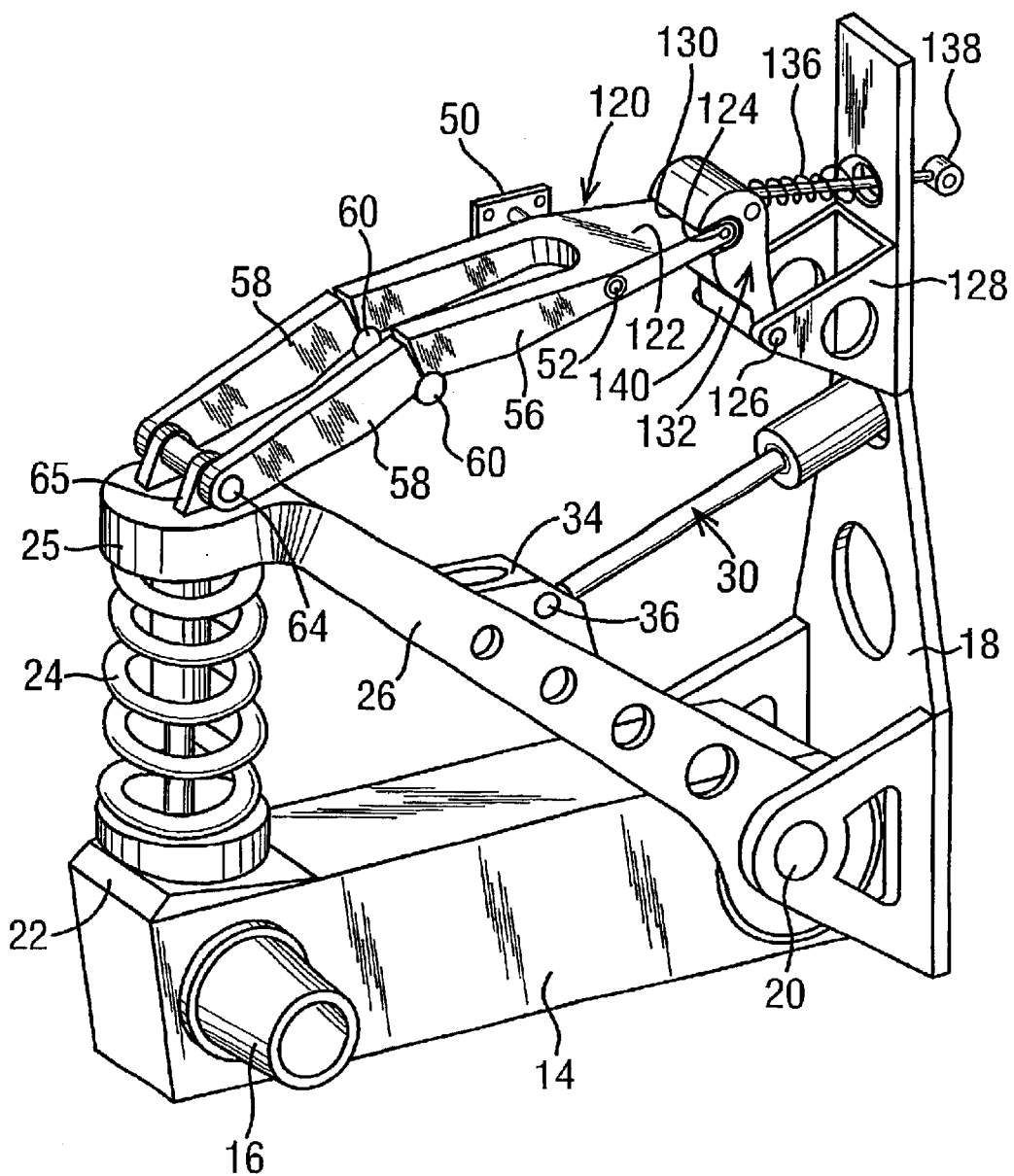
FIG. 4 shows a perspective schematic view of a second embodiment of a suspension system according to the present invention in lowered and locked position.
Figure 5:
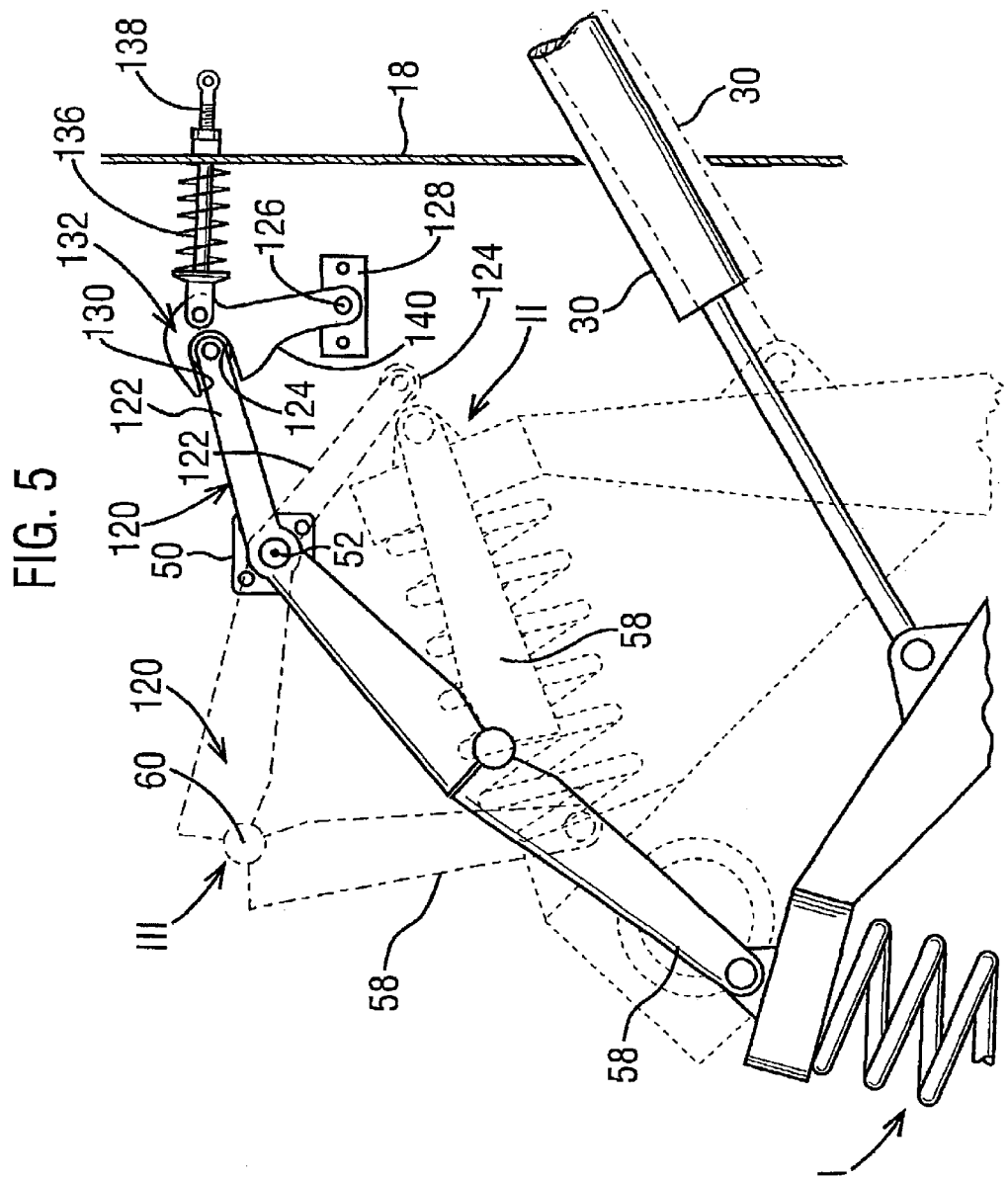
FIG. 5 which shows a side view of the suspension system of FIG. 4 in alternative retracted, intermediate and lowered positions.

A second locking mechanism according to the present invention is shown schematically in FIGS. 4 and 5. The main suspension unit is analogous to unit 10 shown in FIGS. 1 to 3 and is essentially the same in that it possesses the same basic elements of main suspension arm 14, second suspension arm 26, spring damper unit 24, actuating piston and cylinder unit 30 and upper suspension link member and extension arms 58. However, in this second embodiment, the upper U-shaped link member is denoted by numeral 120 in this case and has an elongated finger 122 having a roller 124 pivotally mounted thereto at the outer end thereof. The link 120 is still pivotally mounted on a stub shaft 52 fixed to hull strong point 50 (the U-shaped nature of the link 56 may be more easily appreciated from FIG. 4 and is essentially similar in the first embodiment described with reference to FIGS. 1 to 3 except that the first embodiment does not possess the extension finger 122).

When the suspension is in the lowered, road going configuration at position I, the arms 58 and upper link 120 are generally linearly disposed relative to each other. At this point the extended finger 122 and roller 124 engage with the jaw 130 of a swinging claw member 132 which is pivoted at 126 on a bracket 128 fixed ultimately to the hull 18. The claw 132 is biased towards the finger 122 by a spring 136 acting between the hull and the claw 132. The claw is also connected to a second hydraulic cylinder (not shown) or other actuating means by a rod 138 so as to enable the claw to be retracted away from the finger 122 and roller 124. When the suspension is to be retracted into the wheel well 40 in the hull from the lowered position I, the claw is withdrawn from the roller 124 by the rod 138 allowing the piston cylinder unit 30 to retract and begin to raise the suspension unit 10. As the link 120 and arms 58 begin to fold about the pivot axis 60 (shown in position III in FIG. 5), the finger descends to a lowest position (about commensurate with that shown in FIG. 5 when in position III) after which, in the second half of the raising cycle the finger and roller begin to rise again. Eventually the roller 124 engages the curved face 140 of the claw 132 and pushes the claw to the right as seen in FIG. 5 whereupon the roller eventually reaches the jaw 130 into which it snaps by virtue of the biasing of the claw to the left by the spring 136.

Thus, the suspension unit may be locked in either the retracted or lowered positions by mechanisms which are independent of the piston cylinder unit 30 thus ensuring the safe operation and dependability of the suspension system in both the road-going and water-borne modes.

The two embodiments shown with reference to FIGS. 1 to 5 are non-steering, driven wheel suspension systems. However, by the introduction of a suitable swivel hub at 16, a steering system may be introduced. When the wheels are steered they may not need to be driven and comments relating to drive means may be disregarded in this case. Furthermore, even when the wheels 12 are not steering road wheels, they may not be driven and may be passive.

Although actuating means utilising hydraulic cylinders have been described any suitable means such as pneumatic cylinders, electric motors and the like may be employed.

Although suspension arms 14 and 26 are shown as having a common pivot axis this need not necessarily be the case. The pivot axis of the inner end of the upper link 26 may be raised above that of arm 14 and the pivot axes, arms 14 and 26 and the spring unit 24 may, for example, form a parallelogram action such that the spring unit 24 is raised and lowered in a generally vertical direction. In this case suspension raising and lowering mechanism may alternatively be by, for example, a torsion bar rotating about the axis of the second suspension arm 26, irrespective of whether the road wheel 12 is driven or passive. Such a torsion bar may also provide, when locked in the down position, the road-going spring suspension mechanism.

What is claimed is:

1. A suspension system for an amphibious vehicle which is able to be locked in either a lowered or in a retracted position according to whether the vehicle is on land or in water, respectively, said suspension system comprising:
   a main suspension arm pivoted to a vehicle hull at one end thereof, the main suspension arm having a rotatably mounted road wheel thereon at an opposite end thereof;
   a moving mechanism operably attached to said pivoted main suspension arm to enable said arm and said road wheel to be retracted relative to said hull;
   an upper suspension locking link operably and pivotably connected to the road wheel end of said main suspension arm, said upper suspension link having a pivoted joint intermediate its ends;
   said upper suspension link being pivoted on said hull at an axis remote from said pivoted joint;
   said upper suspension link being operably engagable with a suspension position locking mechanism in both the lowered and retracted positions.

2. A suspension system according to claim 1 wherein the upper suspension locking link comprises two portions;
   a first portion operably extending between said road wheel end of said main suspension arm and said pivoted joint; and
   a second portion extending at least between said pivoted joint and said hull pivot.

3. A suspension system according to claim 1 wherein said upper suspension locking link adopts a generally linear configuration when said suspension system is locked in the lowered position.

4. A suspension system according to claim 1 wherein said upper suspension locking link adopts a folded configuration about said pivoted joint when said suspension is locked in said raised position.

5. A suspension system according to claim 1 wherein a locking strut is pivotally connected to said upper suspension locking link and held in a fixed position by a locking member in both the lowered and raised positions of the suspension system.

6. A suspension system according to claim 5 wherein said strut passes through an aperture in a hull member of the vehicle hull whilst the suspension system is being raised or lowered, said strut being locked by a movable locking member moving in said hull member at extremes of travel of said strut.

7. A suspension system according to claim 5 wherein the movable locking member moves on wheels and is actuated by an associated moving device.

8. A suspension system according to claim 5 wherein said movable locking member comprises a wedge.

9. A suspension system according to claim 5 wherein said hull member comprises a tube of generally rectangular cross section.

10. A suspension system according to claim 5 wherein an upper end of said strut remote from said upper locking link is located by a pivotally mounted trunnion member adjacent said aperture through which said strut passes during raising and lowering of the suspension system.

11. A suspension system according to claim 1 wherein said suspension system is locked in the raised and lowered positions by means of a movable jaw engaging with said upper locking link.

12. A suspension system according to claim 11 wherein said second portion of said upper locking link has an extending finger portion remote from said pivoted joint, said finger portion engaging with said jaw.

13. A suspension system according to claim 11 wherein said jaw is part of a resiliently biased claw member.

14. A suspension system according to claim 13 wherein said claw member has a curved face along which said finger extension travels before being located by said jaw when the suspension is being raised or lowered.

15. A suspension system according to claim 11 wherein said axis about which said second portion of said locking link is pivoted to the vehicle hull is intermediate said pivoted joint and said finger extension.

16. A suspension system according to claim 1 wherein said moving mechanism is a mechanism selected from a group comprising: Hydraulic cylinders, pneumatic cylinders; threaded drives; ball screws; chain drives; and, belt drives.

17. A suspension system according to claim 1 wherein said suspension system has a second suspension arm.

18. A suspension system according to claim 17 wherein an inner end of said second suspension arm has a common pivot axis with said main suspension arm.

19. A suspension system according to claim 17 including a suspension spring unit operably connected between the outer ends of said main suspension arm and said second suspension arm.

20. A suspension system according to claim 17 wherein said moving mechanism is operably connected to said second suspension arm.

21. A suspension system according to claim 17 wherein said moving mechanism comprises a torsion bar rotating about an axis at which a suspension arm is pivoted to said hull.

22. A suspension system according to claim 21 wherein said torsion bar for raising and lowering said suspension system also acts as a suspension spring member for said amphibious vehicle when in a road-going mode.

23. A suspension system according to claim 1 further including a suspension shock absorber operably extending between said main suspension arm and said upper suspension locking link.

* * * * *